(12) United States Patent
Jung

(10) Patent No.: US 10,449,939 B2
(45) Date of Patent: Oct. 22, 2019

(54) BRAKE FLUID PRESSURE SENSOR VALIDITY DETERMINATION DEVICE AND DETERMINATION METHOD THEREOF

(71) Applicant: MANDO CORPORATION, Pyeongtaek-si, Gyeonggi-do (KR)

(72) Inventor: Sam-Hyun Jung, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 85 days.

(21) Appl. No.: 15/794,885

(22) Filed: Oct. 26, 2017

(65) Prior Publication Data

US 2018/0111592 A1    Apr. 26, 2018

(30) Foreign Application Priority Data

Oct. 26, 2016   (KR) .................. 10-2016-0140007

(51) Int. Cl.
*B60T 8/88* (2006.01)
*B60T 17/22* (2006.01)
*B60W 50/02* (2012.01)

(52) U.S. Cl.
CPC ............ *B60T 8/885* (2013.01); *B60T 17/225* (2013.01); *B60T 2270/408* (2013.01); *B60T 2270/413* (2013.01); *B60W 2050/021* (2013.01); *B60W 2520/105* (2013.01)

(58) Field of Classification Search
CPC ........ B60T 8/88; B60T 8/885; B60T 2270/40; B60T 2270/406; B60T 17/225
USPC ..................................................... 701/70, 78
See application file for complete search history.

(56) References Cited

U.S. PATENT DOCUMENTS

2011/0073419 A1* 3/2011 Matsuzaki .............. B60T 7/042
188/106 P

FOREIGN PATENT DOCUMENTS

KR    1990-701583 B1    12/1990
KR    1999-0086835 A    12/1999

* cited by examiner

*Primary Examiner* — Isaac G Smith
(74) *Attorney, Agent, or Firm* — Hauptman Ham, LLP

(57) ABSTRACT

Disclosed herein are a brake fluid pressure sensor validity determination device and a determination method thereof. According to an embodiment of the present disclosure, the brake fluid pressure sensor validity determination device and the determination method thereof includes an inputter configured to receive a brake fluid pressure sensor value sensed by a brake fluid pressure sensor and receive a motor position sensor value sensed by a motor position sensor, an estimator configured to estimate a brake fluid pressure value on the basis of the motor position sensor value when the motor position sensor has not failed; and a determiner configured to determine whether the brake fluid pressure sensor has failed, determine whether the motor position sensor has failed when the brake fluid pressure sensor has not failed, and determine a validity of the brake fluid pressure sensor by comparing the estimated brake fluid pressure value with a brake fluid pressure sensor value.

14 Claims, 11 Drawing Sheets

BRAKE FLUID PRESSURE SENSOR VALIDITY DETERMINATION DEVICE AND DETERMINATION METHOD THEREOF

CROSS-REFERENCE TO RELATED APPLICATION

This application claims the benefit of Korean Patent Application No. 10-2016-0140007, filed on Oct. 26, 2016 in the Korean Intellectual Property Office, the disclosure of which is incorporated herein by reference.

BACKGROUND

1. Field

The present disclosure relates to a brake fluid pressure sensor validity determination device and a determination method thereof.

2. Description of the Related Art

Generally, a conventional electric hydraulic brake device performs hydraulic braking using an electric hydraulic pump and a brake fluid pressure sensor.

That is, the conventional electric hydraulic brake device senses a hydraulic pressure pumped from the electric hydraulic pump using the brake fluid pressure sensor and performs hydraulic braking on the basis of a sensed brake fluid pressure sensor value.

Because the conventional electric hydraulic brake device performs hydraulic braking on the basis of the sensed brake fluid pressure sensor value, it is important to determine a validity of the brake fluid pressure sensor.

Consequently, nowadays, research on an improved brake fluid pressure sensor validity determination device and a determination method thereof capable of improving reliability of a validity determination of a brake fluid pressure sensor by estimating a brake fluid pressure value using different parameters and comparing the estimated brake fluid pressure value with a brake fluid pressure sensor value to determine a validity of the brake fluid pressure sensor is being carried out continuously.

In addition, nowadays, research on an improved brake fluid pressure sensor validity determination device and a determination method thereof in which a driver is allowed to recognize a current state of a brake fluid pressure sensor and a current state for estimating a brake fluid pressure value such that anxiety of a driver about the current states can be suppressed while inducing the driver to drive cautiously is induced is being carried out continuously.

SUMMARY

Therefore, it is an aspect of the present disclosure to provide a brake fluid pressure sensor validity determination device and a determination method thereof capable of improving reliability of a validity determination of a brake fluid pressure sensor.

It is another aspect of the present disclosure to provide a brake fluid pressure sensor validity determination device and a determination method thereof capable of suppressing anxiety of a driver about current states of a brake fluid pressure sensor, a longitudinal acceleration sensor, and a motor position sensor while inducing the driver to drive cautiously.

Additional aspects of the disclosure will be set forth in part in the description which follows and, in part, will be obvious from the description, or may be learned by practice of the disclosure.

In accordance with one aspect of the present disclosure, a brake fluid pressure sensor validity determination device includes an inputter configured to receive a brake fluid pressure sensor value sensed by a brake fluid pressure sensor and receive a motor position sensor value sensed by a motor position sensor, an estimator configured to estimate a brake fluid pressure value on the basis of the motor position sensor value when the motor position sensor has not failed; and a determiner configured to determine whether the brake fluid pressure sensor has failed, determine whether the motor position sensor has failed when the brake fluid pressure sensor has not failed, and determine a validity of the brake fluid pressure sensor by comparing the estimated brake fluid pressure value with a brake fluid pressure sensor value.

Here, the inputter may further receive a longitudinal acceleration sensor value sensed by a longitudinal acceleration sensor; the estimator may further estimate a brake fluid pressure value on the basis of the longitudinal acceleration sensor value when the longitudinal acceleration sensor has not failed; and the determiner may further determine whether the longitudinal acceleration sensor has failed when the motor position sensor has failed.

The determiner may determine that the brake fluid pressure sensor is not valid when a value of a difference between the estimated brake fluid pressure value and the brake fluid pressure sensor value is maintained for a predetermined period.

When determining whether the brake fluid pressure sensor has failed, the determiner may determine whether a sensing signal of the brake fluid pressure sensor is received.

When determining whether the motor position sensor has failed, the determiner may determine whether a sensing signal of the motor position sensor is received.

When determining whether the longitudinal acceleration sensor has failed, the determiner may determine whether a sensing signal of the longitudinal acceleration sensor is received.

When estimating the brake fluid pressure value on the basis of the motor position sensor value, the estimator may calculate a movement value of a power piston on the basis of the motor position sensor value, calculate a brake fluid volume value on the basis of the calculated movement value of the power piston, calculate a required brake fluid value on the basis of the calculated brake fluid volume value, and estimate the brake fluid pressure value on the basis of the calculated required brake fluid value.

When estimating the brake fluid pressure value on the basis of the longitudinal acceleration sensor value, the estimator may calculate a tire brake force value on the basis of a longitudinal vehicle force value calculated using the longitudinal acceleration sensor value and a vehicle weight value, a vehicle rolling resistance value, and a vehicle air resistance value and estimate the brake fluid pressure value on the basis of the calculated tire brake force value.

The brake fluid pressure sensor validity determination device may further include an identifier configured to identify that the brake fluid pressure sensor is not valid when a value of a difference between the estimated brake fluid pressure value and the brake fluid pressure sensor value is maintained for a predetermined period.

The brake fluid pressure sensor validity determination device may further include an identifier configured to identify that the brake fluid pressure sensor has not failed when a sensing signal of the brake fluid pressure sensor is received.

The brake fluid pressure sensor validity determination device may further include an identifier configured to identify that the motor position sensor has not failed when a sensing signal of the motor position sensor is received.

The brake fluid pressure sensor validity determination device may further include an identifier configured to identify that the longitudinal acceleration sensor has not failed when a sensing signal of the longitudinal acceleration sensor is received.

In accordance with another aspect of the present disclosure, a brake fluid pressure sensor validity determination method includes a first reception step in which a brake fluid pressure sensor value sensed by a brake fluid pressure sensor is received, a first determination step in which whether the brake fluid pressure sensor has failed is determined using the received brake fluid pressure sensor value, a second reception step in which a motor position sensor value sensed by a motor position sensor is received when the brake fluid pressure sensor has not failed, a second determination step in which whether the motor position sensor has failed is determined using the received motor position sensor value, a first estimation step in which a brake fluid pressure value is estimated on the basis of the motor position sensor value when the motor position sensor has not failed, and a third determination step in which the estimated brake fluid pressure value and the brake fluid pressure sensor value are compared to determine a validity of the brake fluid pressure sensor.

Here, the brake fluid pressure sensor validity determination method may further include, after the second determination step, a third reception step in which a longitudinal acceleration sensor value sensed by a longitudinal acceleration sensor is received; may further include a fourth determination step in which whether the longitudinal acceleration sensor has failed is determined using the received longitudinal acceleration sensor value; may further include a second estimation step in which a brake fluid pressure value is estimated on the basis of the longitudinal acceleration sensor value when the longitudinal acceleration sensor has not failed; and may further include a fifth determination step in which the estimated brake fluid pressure value and the brake fluid pressure sensor value are compared to determine a validity of the brake fluid pressure sensor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments below are presented to sufficiently convey the spirit of the present disclosure to one of ordinary skill in the art to which the present disclosure pertains. The present disclosure is not limited to the embodiments presented herein and may be embodied in other forms. Parts unrelated to the description may be omitted from the drawings to clarify the present disclosure, and a size of an element for assisting in understanding the present disclosure may be somewhat exaggerated.

Figure 1:
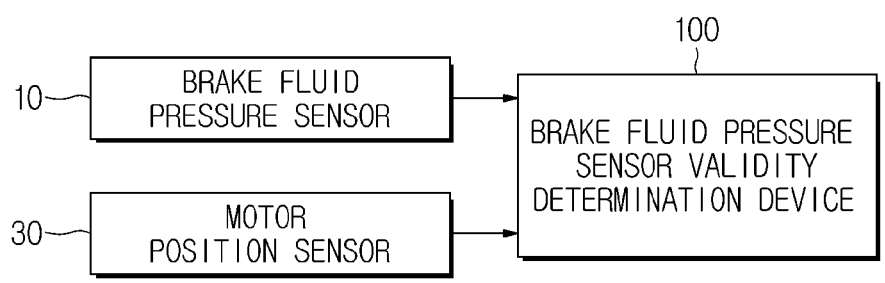
FIG. 1 is a block diagram illustrating a state in which a brake fluid pressure sensor validity determination device according to a first embodiment of the present disclosure is connected to a brake fluid pressure sensor and a motor position sensor.
Figure 2:
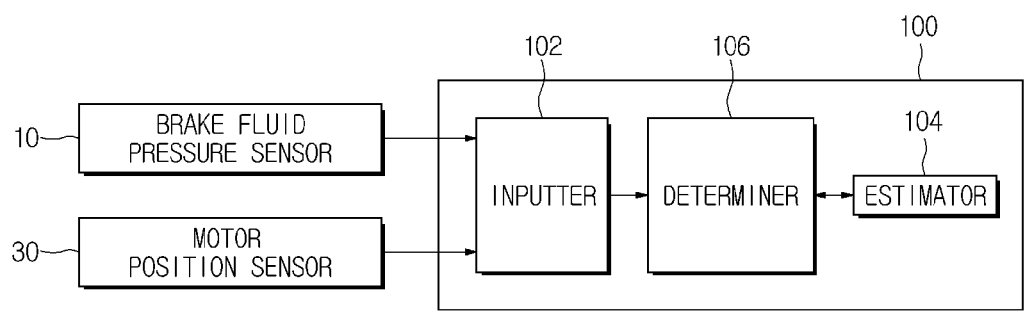
FIG. 2 is a block diagram illustrating an example of the brake fluid pressure sensor validity determination device illustrated in FIG. 1.

FIG. 1 is a block diagram illustrating a state in which a brake fluid pressure sensor validity determination device according to a first embodiment of the present disclosure is connected to a brake fluid pressure sensor and a motor position sensor, and FIG. 2 is a block diagram illustrating an example of the brake fluid pressure sensor validity determination device illustrated in FIG. 1.

Referring to FIGS. 1 and 2, a brake fluid pressure sensor validity determination device 100 according to the first embodiment of the present disclosure includes an inputter 102, an estimator 104, and a determiner 106.

The inputter 102 receives a brake fluid pressure sensor value sensed by a brake fluid pressure sensor 10 and receives a motor position sensor value sensed by a motor position sensor 30.

When the determiner 106, which will be described below, determines that the motor position sensor 30 has not failed, the estimator 104 estimates a brake fluid pressure value on the basis of the motor position sensor value.

Here, when estimating the brake fluid pressure value on the basis of the motor position sensor value, the estimator 104 may calculate a movement value of a power piston on the basis of the motor position sensor value, calculate a brake fluid volume value on the basis of the calculated movement value of the power piston, calculate a required brake fluid value on the basis of the calculated brake fluid volume value, and estimate the brake fluid pressure value on the basis of the calculated required brake fluid value.

Here, when the estimator 104 is in a four-wheel braking mode, the estimator 104 may estimate the brake fluid pressure value on the basis of the motor position sensor value.

The determiner 106 may determine whether the brake fluid pressure sensor 10 has failed, determine whether the motor position sensor 30 has failed when the brake fluid pressure sensor 10 has not failed, and determine a validity of the brake fluid pressure sensor 10 by comparing the brake fluid pressure value estimated from the estimator 104 with the brake fluid pressure sensor value.

Here, the determiner 106 may determine that the brake fluid pressure sensor 10 is not valid when a value of a difference between the brake fluid pressure value estimated from the estimator 104 and the brake fluid pressure sensor value is maintained for a predetermined period.

When determining whether the brake fluid pressure sensor 10 has failed, the determiner 106 may determine whether a sensing signal of the brake fluid pressure sensor 10 is received.

When determining whether the motor position sensor 30 has failed, the determiner 106 may determine whether a sensing signal of the motor position sensor 30 is received.

Here, although not illustrated, the inputter 102, the estimator 104, and the determiner 106 may be provided in a general electric control unit (ECU) (not illustrated) configured to determine, estimate, and receive the overall operation of the vehicle using a main computer applied to the vehicle.

Also, although not illustrated, the inputter 102, the estimator 104, and the determiner 106 may be provided in a general micro control unit (MCU) (not illustrated) configured to determine, estimate, and receive the overall operation of the vehicle by having a processor, a memory, and an input-output device in a single chip.

Embodiments are not limited to the above, and the inputter 102, the estimator 104, and the determiner 106 may be any determiner, estimator, and inputter capable of determining, estimating, and receiving the overall operation of the vehicle.

Here, the inputter 102, the estimator 104, and the determiner 106 may be integrally provided in the ECU (not illustrated) or the MCU (not illustrated), or may be separately provided in the ECU (not illustrated) or the MCU (not illustrated).

A brake fluid pressure sensor validity determination method for determining a validity of the brake fluid pressure sensor 10 using the brake fluid pressure sensor validity determination device 100 according to the first embodiment of the present disclosure will be described with reference to FIG. 3.

Figure 3:
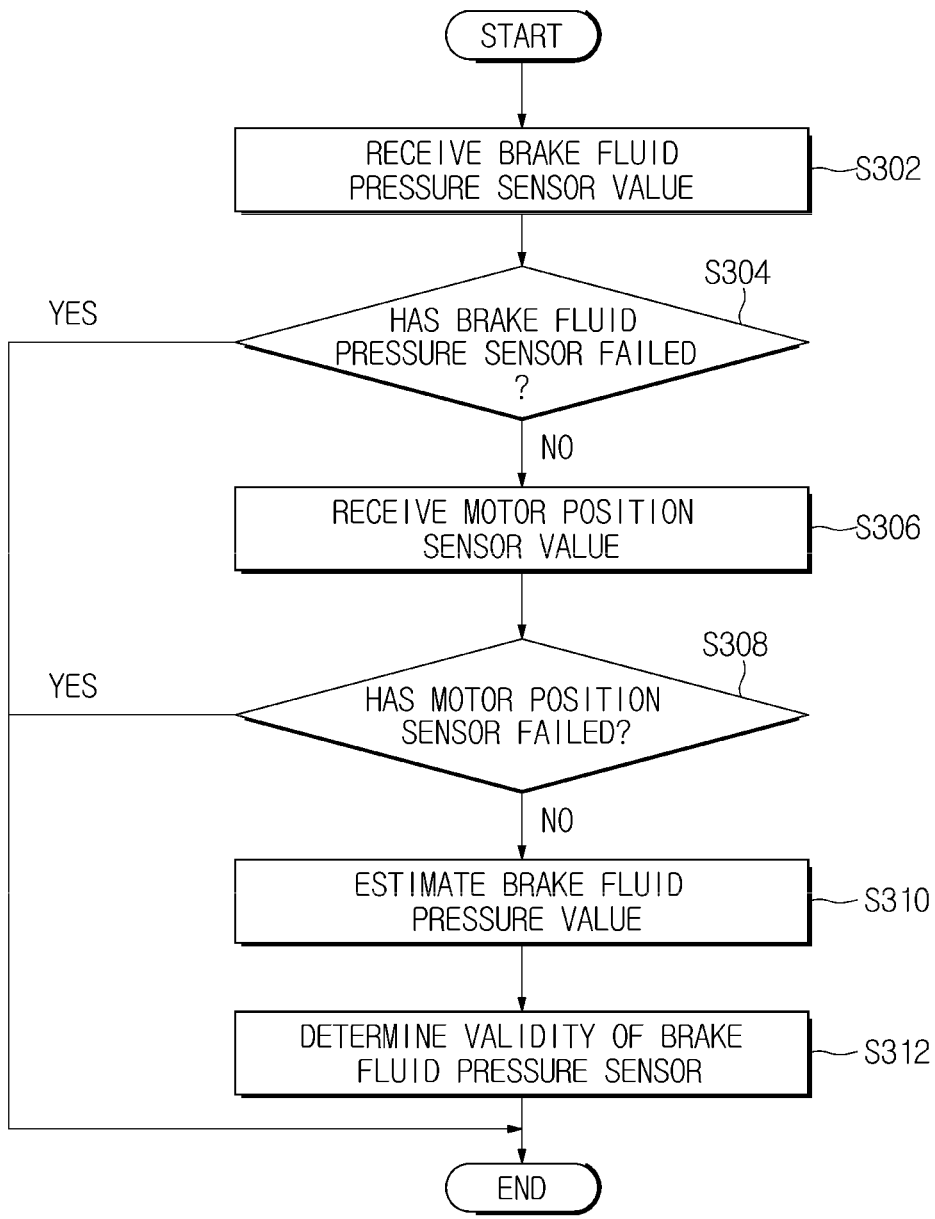
FIG. 3 is a flowchart illustrating a brake fluid pressure sensor validity determination method of the brake fluid pressure sensor validity determination device according to the first embodiment of the present disclosure.

FIG. 3 is a flowchart illustrating a brake fluid pressure sensor validity determination method of the brake fluid pressure sensor validity determination device according to the first embodiment of the present disclosure.

Referring to FIG. 3, a brake fluid pressure sensor validity determination method 300 of the brake fluid pressure sensor validity determination device 100 (see FIG. 2) according to the first embodiment of the present disclosure includes a first reception step (302), a first determination step (304), a second reception step (306), a second determination step (308), a first estimation step (310), and a third determination step (312).

First, in the first reception step (302), a brake fluid pressure sensor value sensed by the brake fluid pressure sensor 10 (see FIG. 2) is received by the inputter 102 (see FIG. 2).

Then, in the first determination step (304), whether the brake fluid pressure sensor 10 (see FIG. 2) has failed is determined by the determiner 106 (see FIG. 2) using a brake fluid pressure sensor value received by the inputter 102 (see FIG. 2).

Here, when the determiner 106 (see FIG. 2) determines whether the brake fluid pressure sensor 10 (see FIG. 2) has failed in the first determination step (304), whether a sensing signal of the brake fluid pressure sensor 10 (see FIG. 2) is received may be determined by the determiner 106 (see FIG. 2).

Then, when the determiner 106 (see FIG. 2) determines that the brake fluid pressure sensor 10 (see FIG. 2) has not failed, a motor position sensor value sensed by the motor position sensor 30 (see FIG. 2) is received by the inputter (102 of FIG. 2) in the second reception step (306).

Then, in the second determination step (308), whether the motor position sensor 30 (see FIG. 2) has failed is determined by the determiner 106 (see FIG. 2) using the motor position sensor value received by the inputter 102 (see FIG. 2).

Here, when determining whether the motor position sensor 30 (see FIG. 2) has failed in the second determination step (308), whether a sensing signal of the motor position sensor 30 (see FIG. 2) is received may be determined by the determiner 106 (see FIG. 2).

Then, when the determiner 106 (see FIG. 2) determines that the motor position sensor 30 (see FIG. 2) has not failed, a brake fluid pressure value is estimated from the estimator 104 (see FIG. 2) on the basis of the motor position sensor value in the first estimation step (310).

Here, in the first estimation step (310), when the brake fluid pressure value is estimated by the estimator 104 (see FIG. 2) on the basis of the motor position sensor value, the estimator 104 (see FIG. 2) may calculate a movement value of a power piston on the basis of the motor position sensor value, calculate a brake fluid volume value on the basis of the calculated movement value of the power piston, calculate a required brake fluid value on the basis of the calculated brake fluid volume value, and estimate a brake fluid pressure value on the basis of the calculated required brake fluid value.

Then, in the third determination step (312), the brake fluid pressure value estimated from the estimator 104 (see FIG. 2) is compared with the brake fluid pressure sensor value by the determiner 106 (see FIG. 2), and a validity of the brake fluid pressure sensor 10 (see FIG. 2) is determined by the determiner 106 (see FIG. 2).

Here, when a value of a difference between the brake fluid pressure value estimated from the estimator 104 (FIG. 2) and the brake fluid pressure sensor value is maintained for a predetermined period, the determiner 106 (see FIG. 2) may determine that the brake fluid pressure sensor 10 (see FIG. 2) is not valid in the third determination step (312).

In this way, the brake fluid pressure sensor validity determination device 100 and the determination method 300 thereof according to the first embodiment of the present disclosure includes the inputter 102, the estimator 104, and the determiner 106, and performs the first reception step (302), the first determination step (304), the second reception step (306), the second determination step (308), the first estimation step (310), and the third determination step (312).

Consequently, because the brake fluid pressure sensor validity determination device 100 and the determination method 300 thereof according to the first embodiment of the present disclosure may estimate the brake fluid pressure value using the motor position sensor value and compare the estimated brake fluid pressure value with the brake fluid pressure sensor value to determine the validity of the brake fluid pressure sensor 10, reliability of a validity determination of the brake fluid pressure sensor 10 may be improved.

Figure 4:
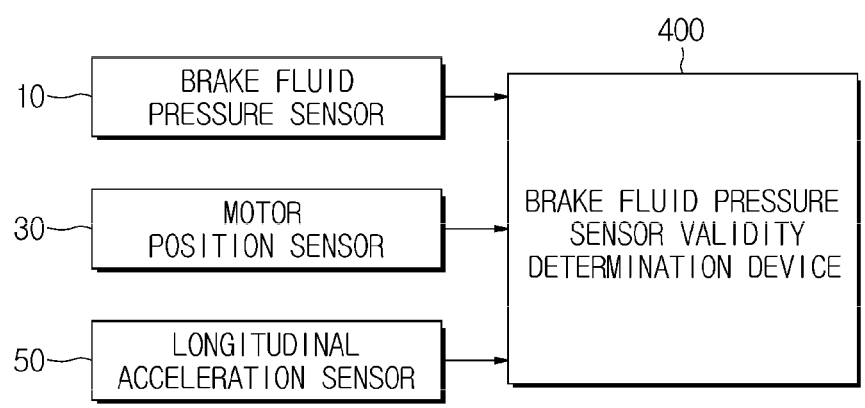
FIG. 4 is a block diagram illustrating a state in which a brake fluid pressure sensor validity determination device according to a second embodiment of the present disclosure is connected to a brake fluid pressure sensor, a motor position sensor, and a longitudinal acceleration sensor.
Figure 5:
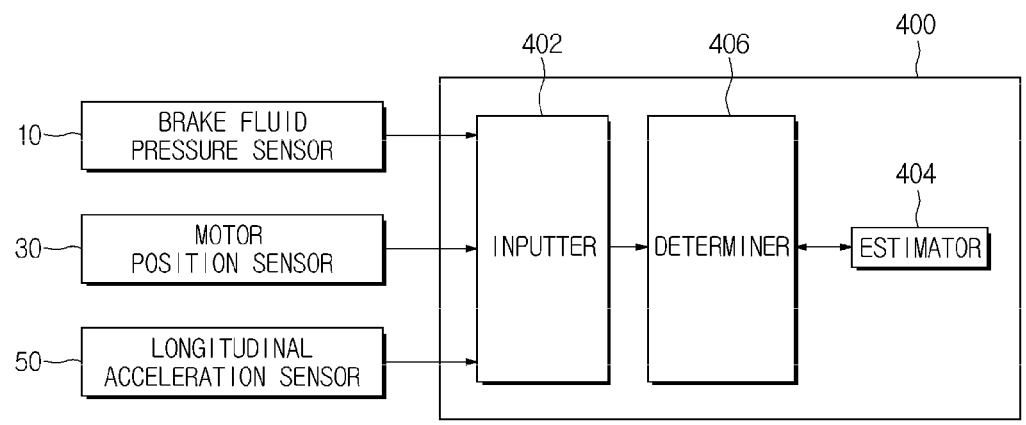
FIG. 5 is a block diagram illustrating an example of the brake fluid pressure sensor validity determination device illustrated in FIG. 4.

FIG. 4 is a block diagram illustrating a state in which a brake fluid pressure sensor validity determination device according to a second embodiment of the present disclosure is connected to a brake fluid pressure sensor, a motor position sensor, and a longitudinal acceleration sensor, and FIG. 5 is a block diagram illustrating an example of the brake fluid pressure sensor validity determination device illustrated in FIG. 4.

Referring to FIGS. 4 and 5, like the brake fluid pressure sensor validity determination device 100 (see FIG. 2) according to the first embodiment, a brake fluid pressure sensor validity determination device 400 according to the second embodiment of the present disclosure includes an inputter 402, an estimator 404, and a determiner 406.

Because functions of the inputter 402, the estimator 404, and the determiner 406 of the brake fluid pressure sensor validity determination device 400 according to the second embodiment of the present disclosure and the organic connection relations therebetween are the same as the functions of the inputter 102 (see FIG. 2), the estimator 104 (see FIG. 2), and the determiner 106 (see FIG. 2) of the brake fluid pressure sensor validity determination device 100 (see FIG. 2) according to the first embodiment of the present disclosure and the organic connection relations therebetween, additional descriptions thereof will be omitted.

Here, the inputter 402 of the brake fluid pressure sensor validity determination device 400 according to the second embodiment of the present disclosure may further receive a longitudinal acceleration sensor value sensed by a longitudinal acceleration sensor 50.

When the determiner 406, which will be described below, determines that the longitudinal acceleration sensor 50 has not failed, the estimator 404 of the brake fluid pressure sensor validity determination device 400 according to the second embodiment of the present disclosure may further estimate a brake fluid pressure value on the basis of the longitudinal acceleration sensor value.

Here, when estimating the brake fluid pressure value on the basis of the longitudinal acceleration sensor value, the estimator 404 may calculate a tire brake force value on the basis of a longitudinal vehicle force value calculated using the longitudinal acceleration sensor value and a vehicle weight value, a vehicle rolling resistance value, and a vehicle air resistance value.

Here, the estimator 404 may estimate the brake fluid pressure value on the basis of the calculated tire brake force value.

Here, when estimating the brake fluid pressure value on the basis of the longitudinal acceleration sensor value, the estimator 404 may estimate the brake fluid pressure value by assuming that the vehicle is running forward at a slow speed and is in a non-controlled state, that a gradient value, which is a slope value of a road surface, is not present, and that the brake fluid pressure value and a wheel pressure value are the same in a state in which a behavior of a wheel valve is not present.

As an example, the estimator 404 may be represented by Equation 1 and Equation 2 below.

$$M\alpha_x = -F_{brk} - F_{roll} - F_{drag} - Mg \sin \theta \quad \text{[Equation 1]}$$

Here, M may be a vehicle weight value, $\alpha_x$ may be a longitudinal acceleration sensor value, $M\alpha_x$ may be a longitudinal vehicle force value, $F_{brk}$ may be a tire brake force value, $F_{roll}$ may be a vehicle rolling resistance value, $F_{drag}$ may be a vehicle air resistance value, and $g \sin \theta$ may be a gradient value.

$$F_{brk} = \mu P_{brk} A_{cyl} \frac{r_{eff}}{r_w} \quad \text{[Equation 2]}$$

Here, $F_{brk}$ may be a tire brake force value, $\mu$ may be a frictional coefficient value between a pad and a disc, $P_{brk}$ may be a pressure value of a brake cylinder that presses the pad, $A_{cyl}$ may be an area value of the brake cylinder that presses the pad, $r_{eff}$ may be a distance value from a center of a tire to a center of the pad, and $r_w$ may be a dynamic radius value of the tire.

When the determiner 406 of the brake fluid pressure sensor validity determination device 400 according to the second embodiment of the present disclosure determines that the motor position sensor 30 has failed, the determiner 406 may further determine whether the longitudinal acceleration sensor 50 has failed and further determine a validity of the brake fluid pressure sensor 10 by comparing the brake fluid pressure value estimated from the estimator 404 with the brake fluid pressure sensor value.

Here, when a value of a difference between the brake fluid pressure value estimated from the estimator 404 and the brake fluid pressure sensor value is maintained for a predetermined period, the determiner 406 may determine that the brake fluid pressure sensor 10 is not valid.

When determining whether the longitudinal acceleration sensor 50 has failed, the determiner 406 may determine whether a sensing signal of the longitudinal acceleration sensor 50 is received.

Here, although not illustrated, the inputter 402, the estimator 404, and the determiner 406 may be provided in a general ECU (not illustrated) configured to determine, estimate, and receive the overall operation of the vehicle using a main computer applied to the vehicle.

Also, although not illustrated, the inputter 402, the estimator 404, and the determiner 406 may be provided in a general MCU (not illustrated) configured to determine, estimate, and receive the overall operation of the vehicle by having a processor, a memory, and an input-output device in a single chip.

Embodiments are not limited to the above, and the inputter 402, the estimator 404, and the determiner 406 may be any determiner, estimator, and inputter capable of determining, estimating, and receiving the overall operation of the vehicle.

Here, the inputter 402, the estimator 404, and the determiner 406 may be integrally provided in the ECU (not illustrated) or the MCU (not illustrated), or may be separately provided in the ECU (not illustrated) or the MCU (not illustrated).

A brake fluid pressure sensor validity determination method for determining a validity of the brake fluid pressure sensor 10 using the brake fluid pressure sensor validity determination device 400 according to the second embodiment of the present disclosure will be described with reference to FIG. 6.

Figure 6:
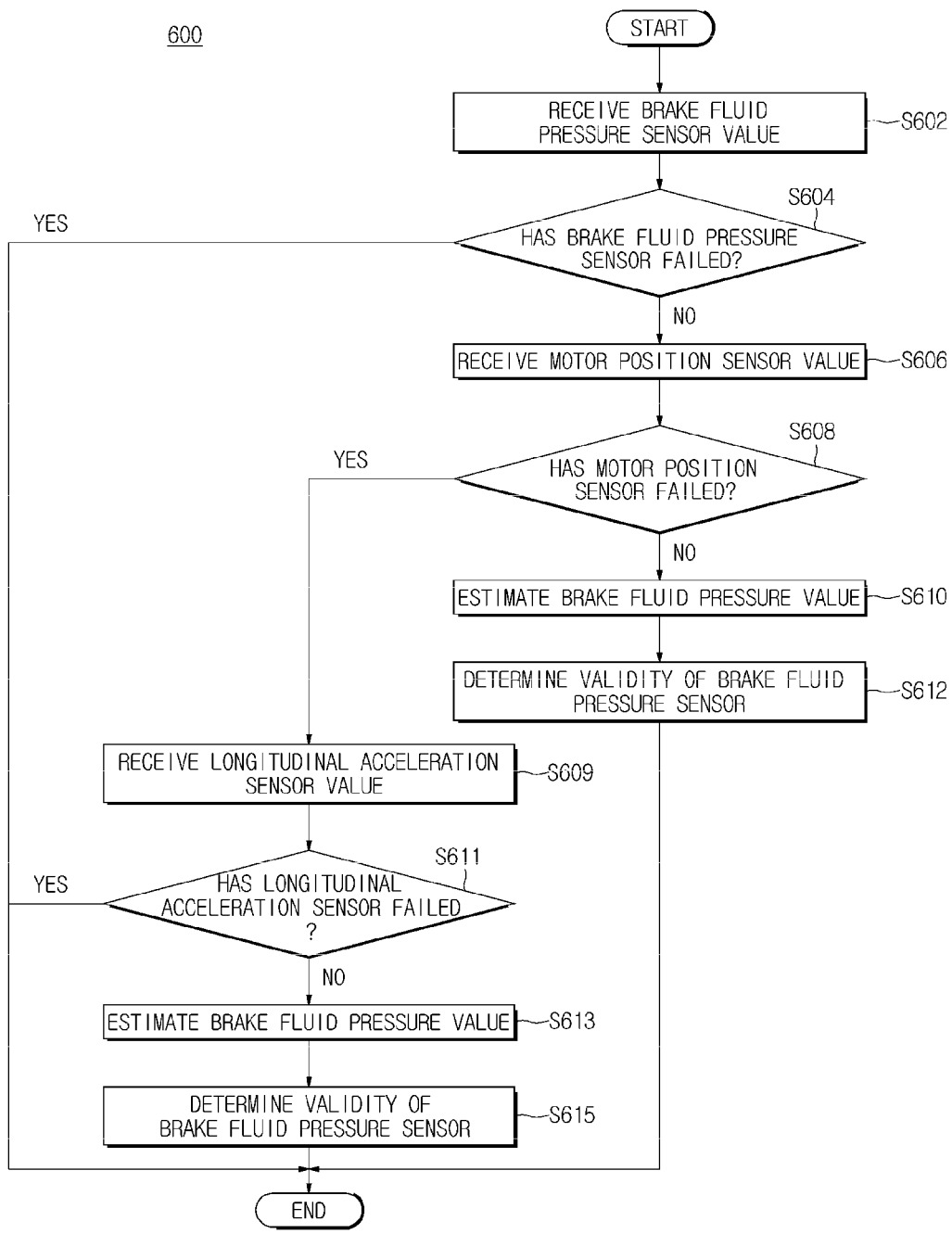
FIG. 6 is a flowchart illustrating a brake fluid pressure sensor validity determination method of the brake fluid pressure sensor validity determination device according to the second embodiment of the present disclosure.

FIG. 6 is a flowchart illustrating a brake fluid pressure sensor validity determination method of the brake fluid pressure sensor validity determination device according to the second embodiment of the present disclosure.

Referring to FIG. 6, like the brake fluid pressure sensor validity determination method 300 (see FIG. 3) of the brake fluid pressure sensor validity determination device 100 (see FIG. 2) according to the first embodiment, a brake fluid pressure sensor validity determination method 600 of the brake fluid pressure sensor validity determination device 400 (see FIG. 5) according to the second embodiment of the present disclosure includes a first reception step (602), a first determination step (604), a second reception step (606), a second determination step (608), a first estimation step (610), and a third determination step (612).

Because functions of the steps of the brake fluid pressure sensor validity determination method 600 of the brake fluid pressure sensor validity determination device 400 (see FIG. 5) according to the second embodiment of the present disclosure and the organic connection relations therebetween are the same as the steps of the brake fluid pressure sensor validity determination method 300 (see FIG. 3) of the brake fluid pressure sensor validity determination device 100 (see FIG. 2) according to the first embodiment and the organic connection relations therebetween, additional descriptions thereof will be omitted.

Here, the brake fluid pressure sensor validity determination method 600 of the brake fluid pressure sensor validity determination device 400 (see FIG. 5) according to the second embodiment of the present disclosure may further include a third reception step (609), a fourth determination step (611), a second estimation step (613), and a fifth determination step (615).

When the motor position sensor 30 (see FIG. 5) is determined by the determiner 406 (see FIG. 5) to have failed after the second determination step, a longitudinal acceleration sensor value sensed by the longitudinal acceleration sensor 50 (see FIG. 5) may be received by the inputter 402 (see FIG. 5) in the third reception step (609).

Then, in the fourth determination step (611), whether the longitudinal acceleration sensor 50 (see FIG. 5) has failed may be determined by the determiner 406 (see FIG. 5) using the longitudinal acceleration sensor value received by the inputter 402 (see FIG. 5).

Here, when the determiner 406 (see FIG. 5) determines whether the longitudinal acceleration sensor 50 (see FIG. 5) has failed in the fourth determination step (611), whether a sensing signal of the longitudinal acceleration sensor 50 (see FIG. 5) is received may be determined by the determiner 406 (see FIG. 5).

Then, when the determiner 406 (see FIG. 5) determines that the longitudinal acceleration sensor 50 (see FIG. 5) has not failed, a brake fluid pressure value may be estimated on the basis of the longitudinal acceleration sensor value by the estimator 404 (see FIG. 5) in the second estimation step (613).

Here, when the estimator 404 (see FIG. 5) estimates the brake fluid pressure value on the basis of the longitudinal acceleration sensor value in the second estimation step (613), a tire brake force value may be calculated by the estimator 404 (see FIG. 5) on the basis of a longitudinal vehicle force value calculated using the longitudinal acceleration sensor value and a vehicle weight value, a vehicle rolling resistance value, and a vehicle air resistance value.

In the second estimation step (613), the brake fluid pressure value may be estimated from the estimator 404 (see FIG. 5) on the basis of the tire brake force value calculated by the estimator 404 (FIG. 5).

Then, in the fifth determination step (615), a validity of the brake fluid pressure sensor 10 (see FIG. 5) may be determined by the determiner 406 (see FIG. 5) by comparing the brake fluid pressure value estimated from the estimator 404 (see FIG. 5) with a brake fluid pressure sensor value.

Here, when a value of a difference between the brake fluid pressure value estimated from the estimator 404 (see FIG. 5) and the brake fluid pressure sensor value is maintained for a predetermined period, the determiner 406 (see FIG. 5) may determine that the brake fluid pressure sensor 10 (see FIG. 5) is not valid in the fifth determination step (615).

In this way, the brake fluid pressure sensor validity determination device 400 and the determination method 600 thereof according to the second embodiment of the present disclosure includes the inputter 402, the estimator 404, and the determiner 406, and performs the first reception step (602), the first determination step (604), the second reception step (606), the second determination step (608), the first estimation step (610), the third determination step (612), the third reception step (609), the fourth determination step (611), the second estimation step (613), and the fifth determination step (615).

Consequently, because the brake fluid pressure sensor validity determination device 400 and the determination method 600 thereof according to the second embodiment of the present disclosure may estimate the brake fluid pressure value using the motor position sensor value and the longitudinal acceleration sensor value and may compare the estimated brake fluid pressure value with the brake fluid pressure sensor value to determine the validity of the brake fluid pressure sensor 10, reliability of a validity determination of the brake fluid pressure sensor 10 may be further improved.

Figure 7:
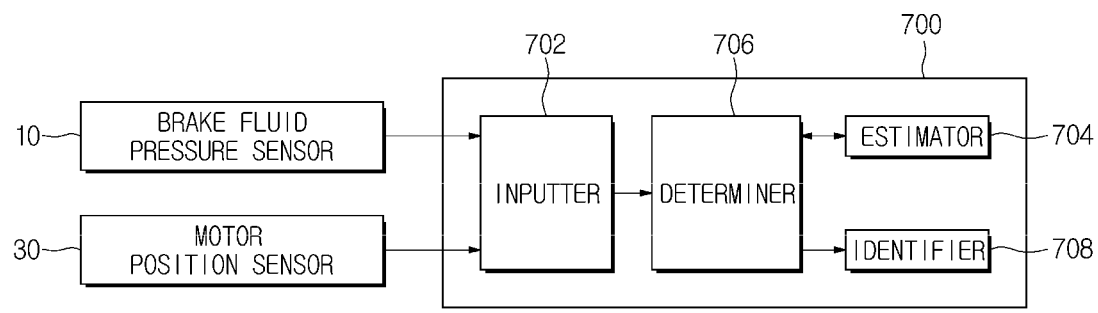
FIG. 7 is a block diagram illustrating an example of a brake fluid pressure sensor validity determination device according to a third embodiment of the present disclosure.

FIG. 7 is a block diagram illustrating an example of a brake fluid pressure sensor validity determination device according to a third embodiment of the present disclosure.

Referring to FIG. 7, like the brake fluid pressure sensor validity determination device 100 (see FIG. 2) according to the first embodiment, a brake fluid pressure sensor validity determination device 700 according to the third embodiment of the present disclosure includes an inputter 702, an estimator 704, and a determiner 706.

Because functions of the inputter 702, the estimator 704, and the determiner 706 of the brake fluid pressure sensor validity determination device 700 according to the third embodiment of the present disclosure and the organic connection relations therebetween are the same as the functions of the inputter 102 (see FIG. 2), the estimator 104 (see FIG. 2), and the determiner 106 (see FIG. 2) of the brake fluid pressure sensor validity determination device 100 (see FIG. 2) according to the first embodiment of the present disclosure and the organic connection relations therebetween, additional descriptions thereof will be omitted.

Here, the brake fluid pressure sensor validity determination device 700 according to the third embodiment of the present disclosure may further include an identifier 708.

That is, when the determiner 706 determines that a value of a difference between a brake fluid pressure value estimated from the estimator 704 and a brake fluid pressure sensor value is maintained for a predetermined period, the identifier 708 may identify that the brake fluid pressure sensor 10 is not valid.

When the determiner 706 determines that a sensing signal of the motor position sensor 30 is received, the identifier 708 may identify that the motor position sensor 30 has not failed.

Here, although not illustrated, the identifier 708 may include at least one of an alarm (not illustrated), a speaker (not illustrated), and a light emitting member (not illustrated) provided for a driver to identify information or a state of a vehicle and identify that the brake fluid pressure sensor 10 is not valid, identify that the brake fluid pressure sensor 10 has not failed, and identify that the motor position sensor 30 has not failed on the basis of at least one operation of an alarm operation of the alarm (not illustrated), a sound operation of the speaker (not illustrated), and a light emitting operation of the light emitting member (not illustrated).

Although not illustrated, the identifier 708 may include at least one of a human machine interface (HMI) module (not illustrated) and a head-up display (HUD) module (not illustrated) which are embedded for interfacing between a user and a machine such that the driver recognizes the information or state of the vehicle, and identify that the brake fluid pressure sensor 10 is not valid, identify that the brake fluid pressure sensor 10 has not failed, and identify that the motor position sensor 30 has not failed on the basis of at least one operation of a HMI message display operation of the HMI module (not illustrated) and a HUD message display operation of the HUD module (not illustrated).

A brake fluid pressure sensor validity determination method for determining a validity of the brake fluid pressure sensor 10 using the brake fluid pressure sensor validity determination device 700 according to the third embodiment of the present disclosure will be described with reference to FIGS. 8 to 10.

Figure 8:
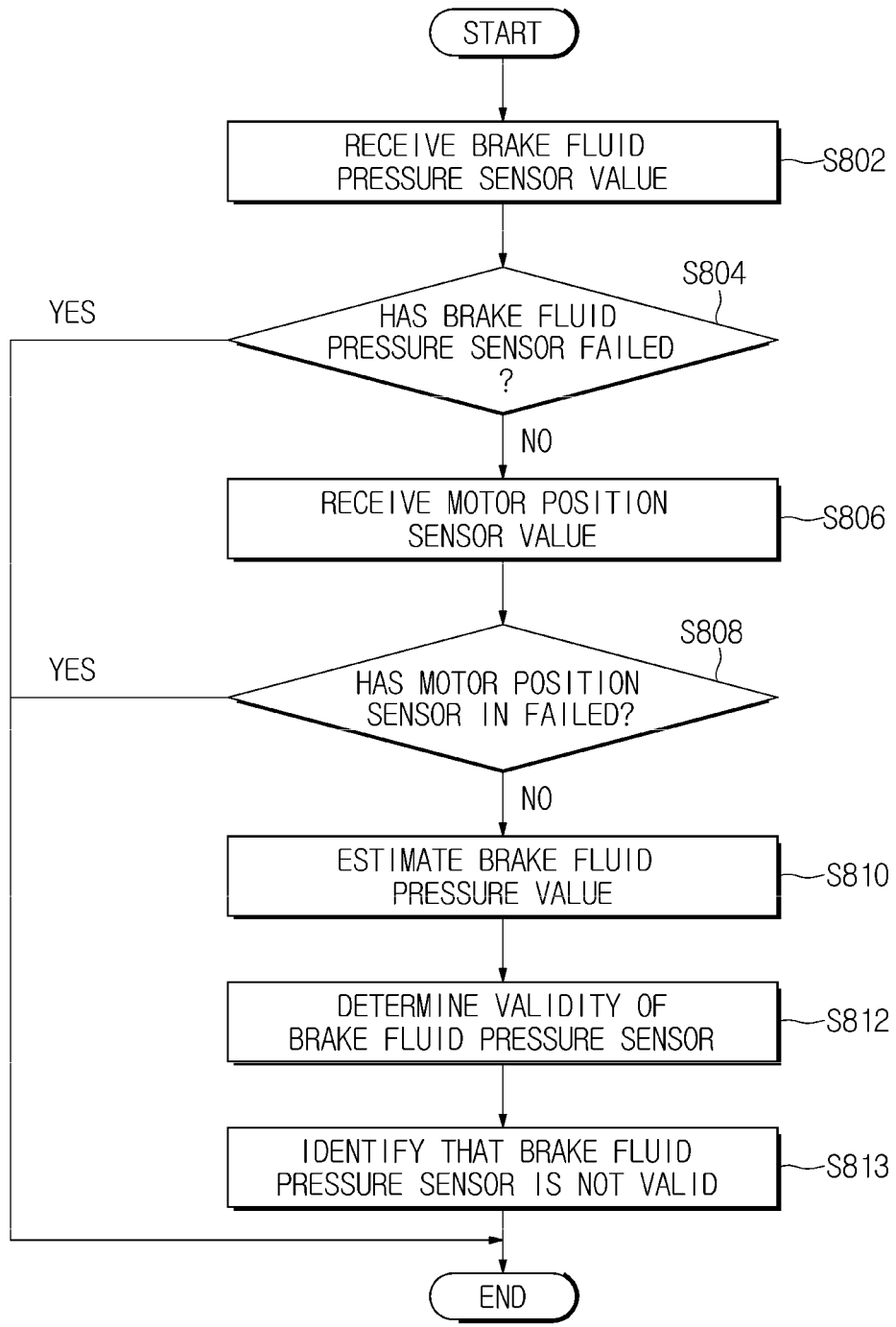
FIG. 8 is a flowchart illustrating an example of a brake fluid pressure sensor validity determination method of the brake fluid pressure sensor validity determination device according to the third embodiment of the present disclosure.
Figure 9:
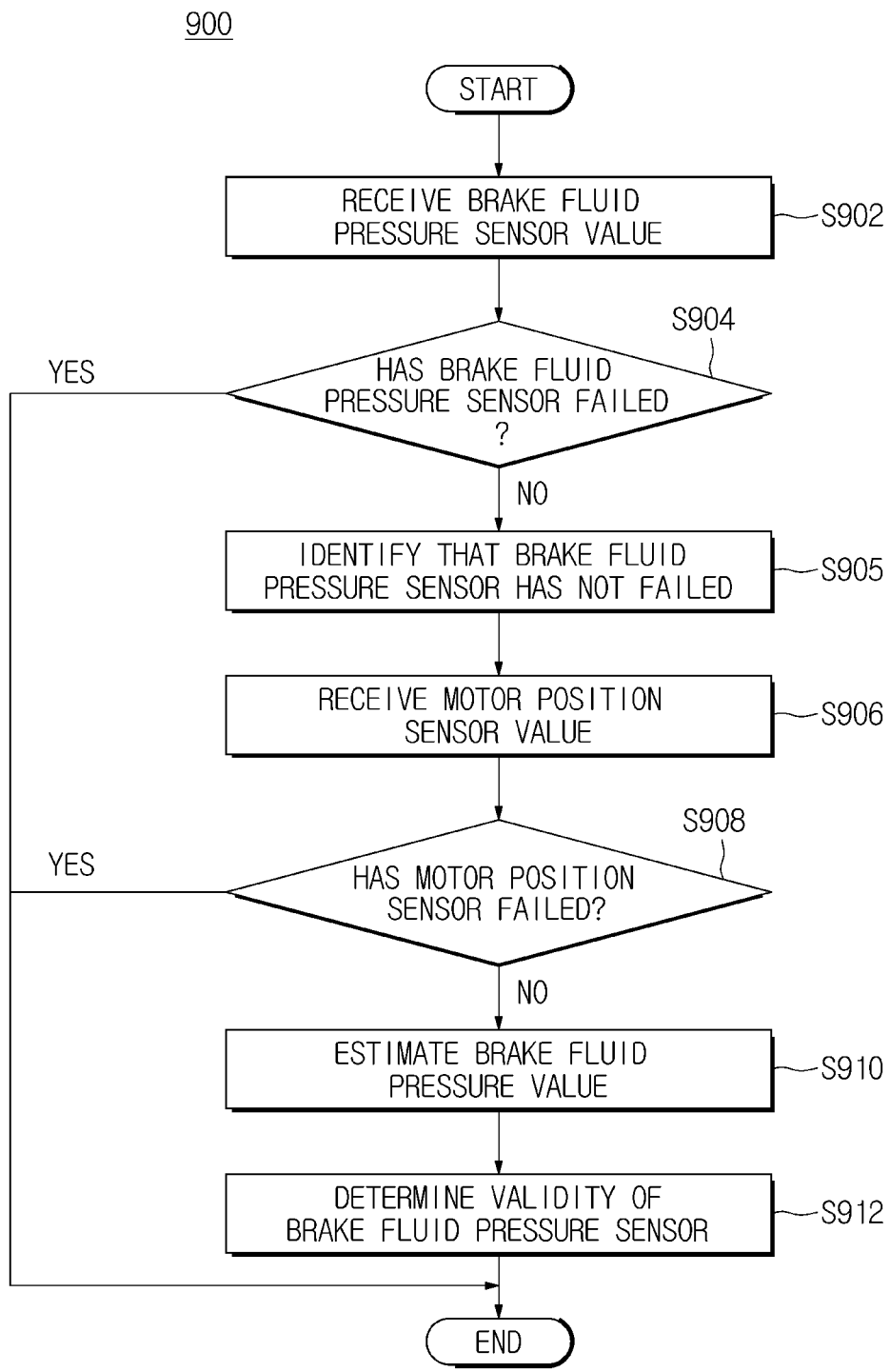
FIG. 9 is a flowchart illustrating another example of the brake fluid pressure sensor validity determination method of the brake fluid pressure sensor validity determination device according to the third embodiment of the present disclosure.

FIG. 8 is a flowchart illustrating an example of a brake fluid pressure sensor validity determination method of the brake fluid pressure sensor validity determination device according to the third embodiment of the present disclosure, and FIG. 9 is a flowchart illustrating another example of the brake fluid pressure sensor validity determination method of the brake fluid pressure sensor validity determination device according to the third embodiment of the present disclosure.

Figure 10:
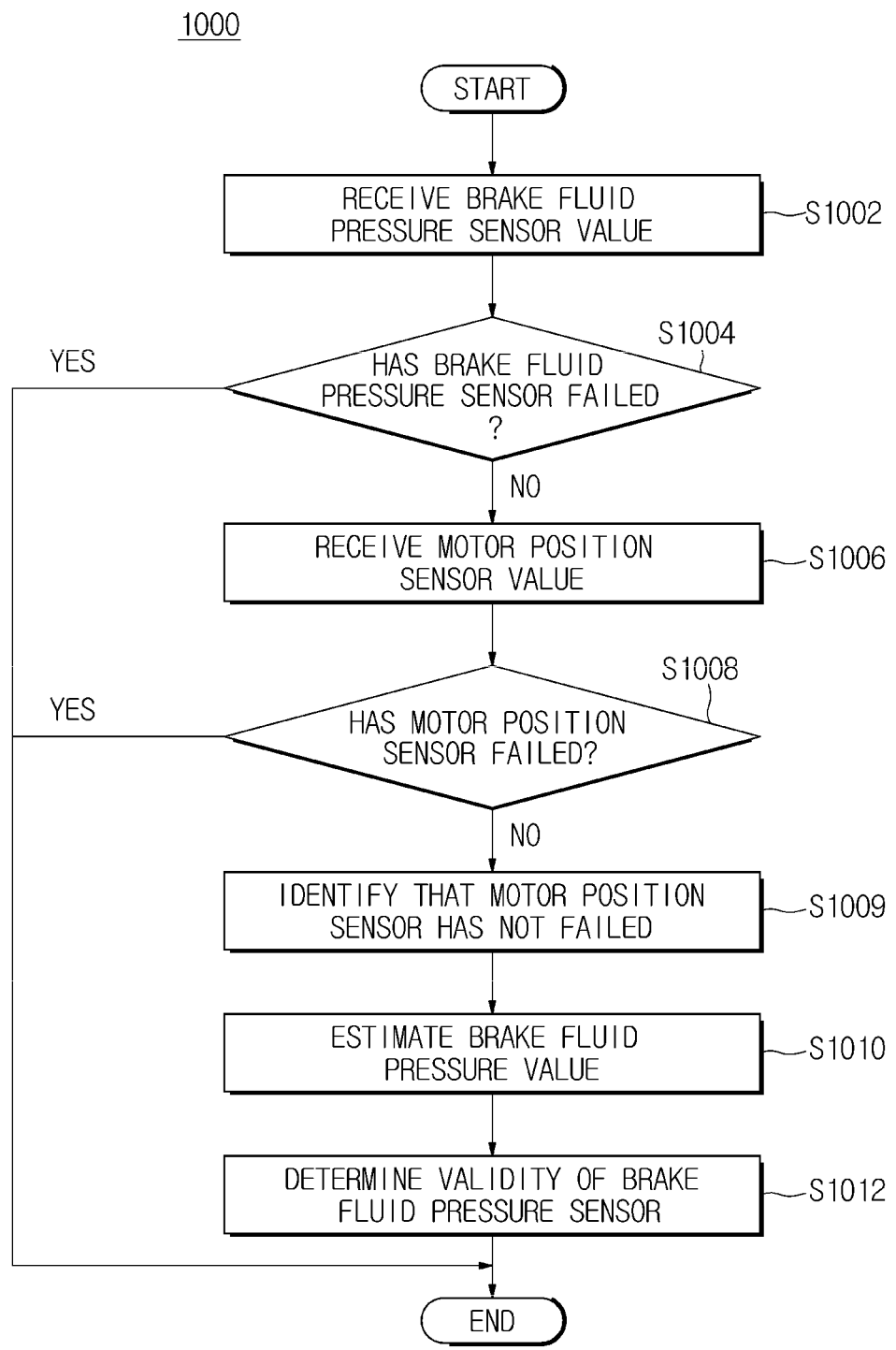
FIG. 10 is a flowchart illustrating still another example of the brake fluid pressure sensor validity determination method of the brake fluid pressure sensor validity determination device according to the third embodiment of the present disclosure.

FIG. 10 is a flowchart illustrating still another example of the brake fluid pressure sensor validity determination method of the brake fluid pressure sensor validity determination device according to the third embodiment of the present disclosure.

Referring to FIGS. 8 to 10, like the brake fluid pressure sensor validity determination method 300 (see FIG. 3) of the brake fluid pressure sensor validity determination device 100 (see FIG. 2) according to the first embodiment, brake fluid pressure sensor validity determination methods 800 to 1000 of the brake fluid pressure sensor validity determination device 700 (see FIG. 7) according to the third embodiment of the present disclosure includes first reception steps (802 to 1002), first determination steps (804 to 1004), second reception steps (806 to 1006), second determination steps (808 to 1008), first estimation steps (810 to 1010), and third determination steps (812 to 1012), respectively.

Because functions of the steps of the brake fluid pressure sensor validity determination methods 800 to 1000 of the brake fluid pressure sensor validity determination device 700 (see FIG. 7) according to the third embodiment of the present disclosure and the organic connection relations therebetween are the same as the steps of the brake fluid pressure sensor validity determination method 300 (see FIG. 3) of the brake fluid pressure sensor validity determination device 100 (see FIG. 2) according to the first embodiment and the organic connection relations therebetween, additional descriptions thereof will be omitted.

Here, the brake fluid pressure sensor validity determination methods 800 to 1000 of the brake fluid pressure sensor validity determination device 700 (see FIG. 7) according to the third embodiment of the present disclosure may further include a first identification step (813), a second identification step (905), and a third identification step (1009), respectively.

The first identification step (813) may be performed after the third determination step (812).

When a value of a difference between a brake fluid pressure value estimated from the estimator 704 (see FIG. 7) and the brake fluid pressure sensor value is determined by the determiner 706 (see FIG. 7) as being maintained for a predetermined period, the identifier 708 (see FIG. 7) may identify that the brake fluid pressure sensor 10 (see FIG. 7) is not valid in the first identification step (813).

The second identification step (905) may be performed after the first determination step (904) and before the second reception step (906).

As another example, although not illustrated, the second identification step (905) may be performed in synchronization with the second reception step (906).

When the determiner 706 (see FIG. 7) determines that a sensing signal of the brake fluid pressure sensor 10 (see FIG. 7) is received, the identifier 708 (see FIG. 7) may identify that the brake fluid pressure sensor 10 (see FIG. 7) has not failed in the second identification step (905).

The third identification step (1009) may be performed after the second determination step (1008) and before the first estimation step (1010).

As another example, although not illustrated, the third identification step (1009) may be performed in synchronization with the first estimation step (1010).

When the determiner 706 (see FIG. 7) determines that a sensing signal of the motor position sensor 30 (see FIG. 7) is received, the identifier 708 (see FIG. 7) may identify that the motor position sensor 30 (see FIG. 7) has not failed in the third identification step (1009).

In this way, the brake fluid pressure sensor validity determination device 700 and the determination methods 800 to 1000 thereof according to the third embodiment of the present disclosure include the inputter 702, the estimator 704, the determiner 706, and the identifier 708 and perform the first reception steps (802 to 1002), the first determination steps (804 to 1004), the first, second, and third identification steps (813, 905, and 1009), the second reception steps (806 to 1006), the second determination steps (808 to 1008), the first estimation steps (810 to 1010), and the third determination steps (812 to 1012), respectively.

Consequently, because the brake fluid pressure sensor validity determination device 700 and the determination methods 800 to 1000 thereof according to the third embodiment of the present disclosure may estimate the brake fluid pressure value using the motor position sensor value and compare the estimated brake fluid pressure value with the brake fluid pressure sensor value to determine the validity of the brake fluid pressure sensor 10, reliability of a validity determination of the brake fluid pressure sensor 10 may be improved.

Also, the brake fluid pressure sensor validity determination device 700 and the determination methods 800 to 1000 thereof according to the third embodiment of the present disclosure may identify that the brake fluid pressure sensor 10 is not valid, identify that the brake fluid pressure sensor 10 has not failed, and identify that the motor position sensor 30 has not failed.

Consequently, because the brake fluid pressure sensor validity determination device 700 and the determination methods 800 to 1000 thereof according to the third embodiment of the present disclosure may allow a driver to recognize current states of the brake fluid pressure sensor 10 and the motor position sensor 30, anxiety of the driver about the current states of the brake fluid pressure sensor 10 and the motor position sensor 30 may be suppressed while inducing the driver to drive cautiously.

Figure 11:
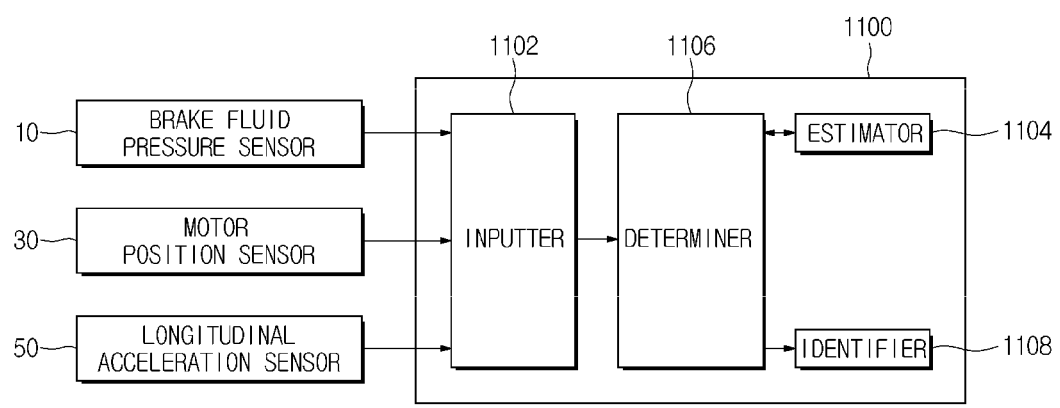
FIG. 11 is a block diagram illustrating an example of a brake fluid pressure sensor validity determination device according to a fourth embodiment of the present disclosure.

FIG. 11 is a block diagram illustrating an example of a brake fluid pressure sensor validity determination device according to a fourth embodiment of the present disclosure.

Referring to FIG. 11, like the brake fluid pressure sensor validity determination device 400 (see FIG. 5) according to the second embodiment, a brake fluid pressure sensor validity determination device 1100 according to the fourth embodiment of the present disclosure includes an inputter 1102, an estimator 1104, and a determiner 1106.

Because functions of the inputter 1102, the estimator 1104, and the determiner 1106 of the brake fluid pressure sensor validity determination device 1100 according to the fourth embodiment of the present disclosure and the organic connection relations therebetween are the same as the functions of the inputter 402 (see FIG. 5), the estimator 404 (see FIG. 5), and the determiner 406 (see FIG. 5) of the brake fluid pressure sensor validity determination device 400 (see FIG. 5) according to the second embodiment and the organic connection relations therebetween, additional descriptions thereof will be omitted.

Here, the brake fluid pressure sensor validity determination device 1100 according to the fourth embodiment of the present disclosure may further include an identifier 1108.

That is, when the determiner 1106 determines that a sensing signal of the longitudinal acceleration sensor 50 is received, the identifier 1108 may identify that the longitudinal acceleration sensor 50 has not failed.

When the determiner 1106 determines that a value of a difference between a brake fluid pressure value estimated from the estimator 1104 and a brake fluid pressure sensor value is maintained for a predetermined period, the identifier 1108 may identify that the brake fluid pressure sensor 10 is not valid.

Here, although not illustrated, the identifier 1108 may include at least one of an alarm (not illustrated), a speaker (not illustrated), and a light emitting member (not illustrated) provided for a driver to identify information or a state of a vehicle, and identify that the longitudinal acceleration sensor 50 has not failed and identify that the brake fluid pressure sensor 10 is not valid on the basis of at least one operation of an alarm operation of the alarm (not illustrated), a sound operation of the speaker (not illustrated), and a light emitting operation of the light emitting member (not illustrated).

Although not illustrated, the identifier 1108 may include at least one of a HMI module (not illustrated) and a HUD module (not illustrated) which are embedded for interfacing between a user and a machine such that the driver recognizes the information or state of the vehicle, and identify that the longitudinal acceleration sensor 50 has not failed and identify that the brake fluid pressure sensor 10 is not valid on the basis of at least one operation of a HMI message display operation of the HMI module (not illustrated) and a HUD message display operation of the HUD module (not illustrated).

A brake fluid pressure sensor validity determination method for determining a validity of the brake fluid pressure sensor 10 using the brake fluid pressure sensor validity determination device 1100 according to the fourth embodiment of the present disclosure will be described with reference to FIGS. 12 and 13.

Figure 12:
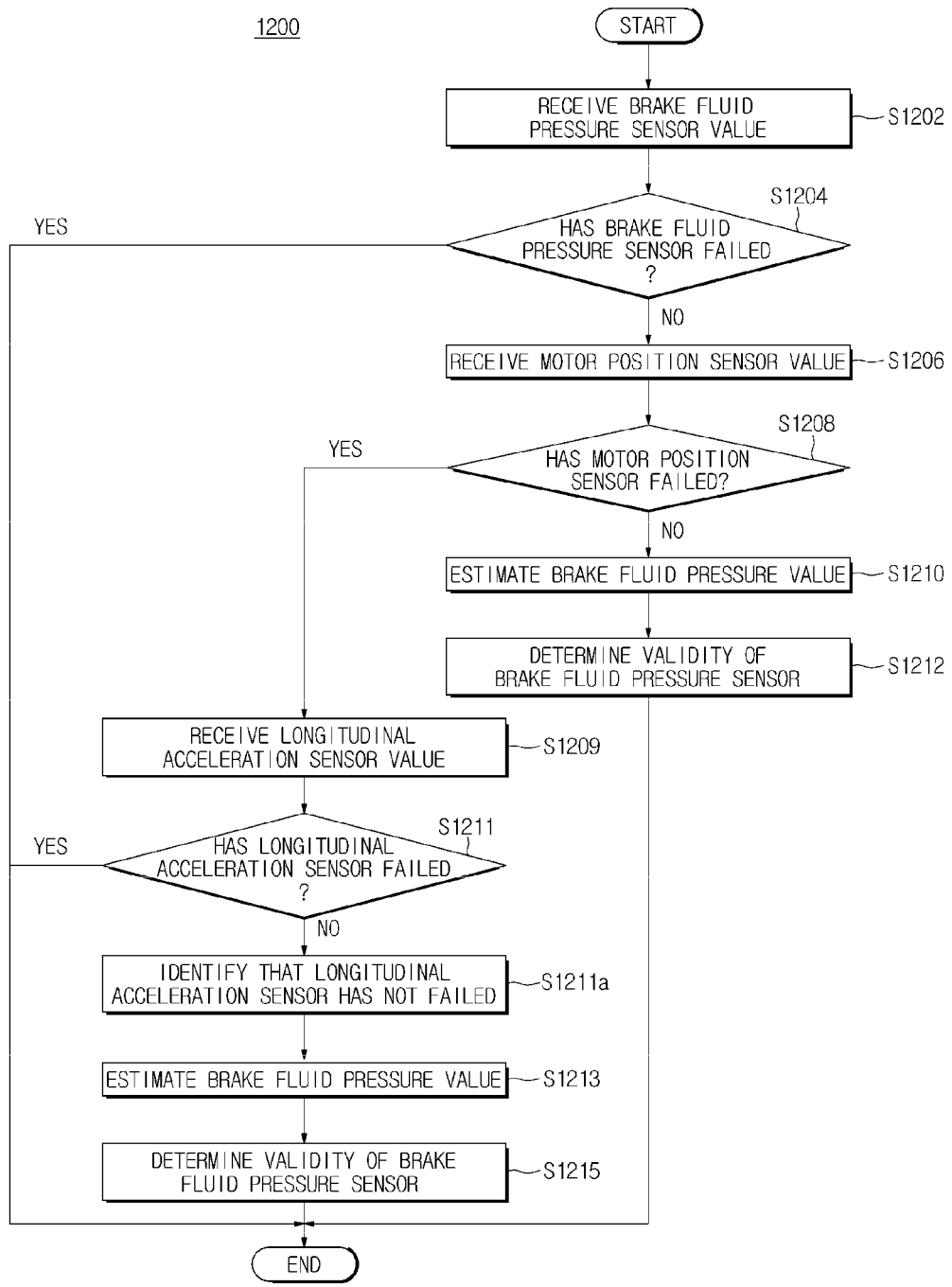
FIG. 12 is a flowchart illustrating an example of a brake fluid pressure sensor validity determination method of the brake fluid pressure sensor validity determination device according to the fourth embodiment of the present disclosure.
Figure 13:
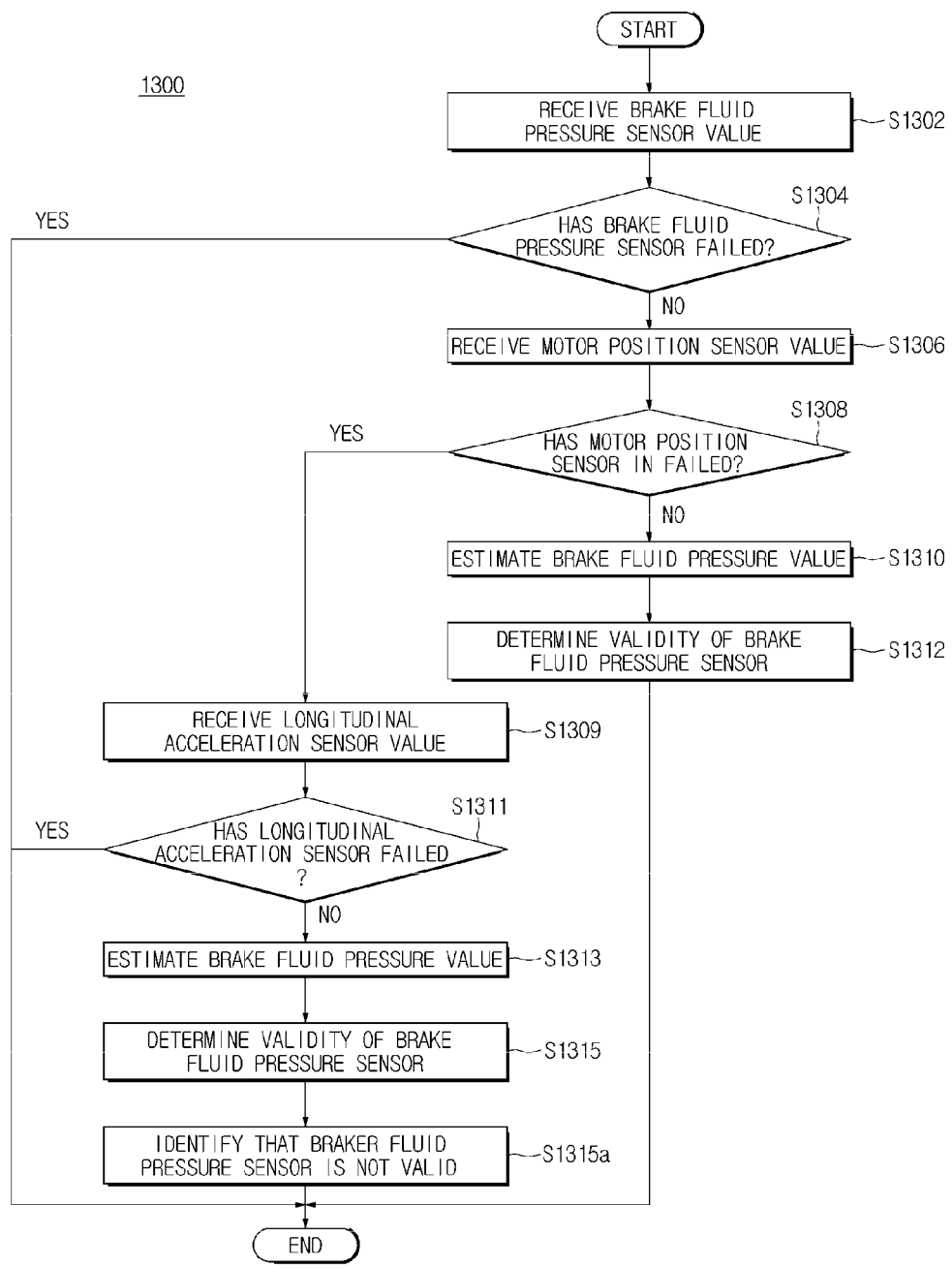
FIG. 13 is a flowchart illustrating another example of the brake fluid pressure sensor validity determination method of the brake fluid pressure sensor validity determination device according to the fourth embodiment of the present disclosure.

FIG. 12 is a flowchart illustrating an example of a brake fluid pressure sensor validity determination method of the brake fluid pressure sensor validity determination device according to the fourth embodiment of the present disclosure, and FIG. 13 is a flowchart illustrating another example of the brake fluid pressure sensor validity determination method of the brake fluid pressure sensor validity determination device according to the fourth embodiment of the present disclosure.

Referring to FIGS. 12 and 13, like the brake fluid pressure sensor validity determination method 600 (see FIG. 6) of the brake fluid pressure sensor validity determination device 400 (see FIG. 5) according to the second embodiment, brake fluid pressure sensor validity determination methods 1200 and 1300 of the brake fluid pressure sensor validity determination device 1100 (see FIG. 11) according to the fourth embodiment of the present disclosure include first reception steps (1202 and 1302), first determination steps (1204 and 1304), second reception steps (1206 and 1306), second determination steps (1208 and 1308), first estimation steps (1210 and 1310), third determination steps (1212 and 1312), third reception steps (1209 and 1309), fourth determination steps (1211 and 1311), second estimation steps (1213 and 1313), and fifth determination steps (1215 and 1315), respectively.

Because functions of the steps of the brake fluid pressure sensor validity determination methods 1200 and 1300 of the brake fluid pressure sensor validity determination device 1100 (see FIG. 11) according to the fourth embodiment of the present disclosure and the organic connection relations therebetween are the same as the steps of the brake fluid pressure sensor validity determination method 600 (see FIG. 6) of the brake fluid pressure sensor validity determination device 400 (see FIG. 5) according to the second embodiment and the organic connection relations therebetween, additional descriptions thereof will be omitted.

Here, the brake fluid pressure sensor validity determination methods 1200 and 1300 of the brake fluid pressure sensor validity determination device 1100 (see FIG. 11) according to the fourth embodiment of the present disclosure may further include a fourth identification step (1211a) and a fifth identification step (1315a), respectively.

The fourth identification step (1211a) may be performed after the fourth determination step (1211) and before the second estimation step (1213).

As another example, although not illustrated, the fourth identification step (1211a) may be performed in synchronization with the second estimation step (1213).

When the determiner 1106 (see FIG. 11) determines that a sensing signal of the longitudinal acceleration sensor 50 (see FIG. 11) is received, the identifier 1108 (see FIG. 11)

may identify that the longitudinal acceleration sensor 50 (see FIG. 11) has not failed in the fourth identification step (1211*a*).

The fifth identification step (1315*a*) may be performed after the fifth determination step (1315).

When the determiner 1106 (see FIG. 11) determines that a value of a difference between a brake fluid pressure value estimated from the estimator 1104 (see FIG. 11) and the brake fluid pressure sensor value is maintained for a predetermined period, the identifier 1108 (see FIG. 11) may identify that the brake fluid pressure sensor 10 (see FIG. 11) is not valid.

In this way, the brake fluid pressure sensor validity determination device 1100 and the determination methods 1200 and 1300 thereof according to the fourth embodiment of the present disclosure include the inputter 1102, the estimator 1104, the determiner 1106, and the identifier 1108 and perform the first reception steps (1202 and 1302), the first determination steps (1204 and 1304), the second reception steps (1206 and 1306), the second determination steps (1208 and 1308), the first estimation steps (1210 and 1310), the third determination steps (1212 and 1312), the third reception steps (1209 and 1309), the fourth determination steps (1211 and 1311), the fourth and fifth identification step (1211*a* and 1315*a*), the second estimation steps (1213 and 1313), and the fifth determination steps (1215 and 1315), respectively.

Consequently, because the brake fluid pressure sensor validity determination device 1100 and the determination methods 1200 and 1300 thereof according to the fourth embodiment of the present disclosure may estimate the brake fluid pressure value using the motor position sensor value and the longitudinal acceleration sensor value and compare the estimated brake fluid pressure value with the brake fluid pressure sensor value to determine the validity of the brake fluid pressure sensor 10, reliability of a validity determination of the brake fluid pressure sensor 10 may be further improved.

Also, the brake fluid pressure sensor validity determination device 1100 and the determination methods 1200 and 1300 thereof according to the fourth embodiment of the present disclosure may identify that the longitudinal acceleration sensor 50 has not failed and the brake fluid pressure sensor 10 is not valid.

Consequently, because the brake fluid pressure sensor validity determination device 1100 and the determination methods 1200 and 1300 thereof according to the fourth embodiment of the present disclosure may allow a driver to recognize current states of the brake fluid pressure sensor 10 and the longitudinal acceleration sensor 50, anxiety of the driver about the current states of the brake fluid pressure sensor 10 and the longitudinal acceleration sensor 50 may be suppressed while inducing the driver to drive cautiously.

As should be apparent from the above description, a brake fluid pressure sensor validity determination device and a determination thereof in accordance with one embodiment of the present disclosure can improve reliability of a validity determination of a brake fluid pressure sensor.

Also, the brake fluid pressure sensor validity determination device and the determination thereof can suppress anxiety of a driver about current states of a brake fluid pressure sensor, a longitudinal acceleration sensor, and a motor position sensor while inducing the driver to drive cautiously.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:

1. A brake fluid pressure sensor validity determination device comprising a processor, wherein said processor is configured to:
   receive, from a brake fluid pressure sensor, a brake fluid pressure sensor value sensed by the brake fluid pressure sensor;
   determine whether the brake fluid pressure sensor has failed by using the received brake fluid pressure sensor value;
   receive, from a motor position sensor, a motor position sensor value sensed by the motor position sensor when it is determined that the brake fluid pressure sensor has not failed;
   determine whether the motor position sensor has failed by using the received motor position sensor value;
   estimate a brake fluid pressure value on the basis of the received motor position sensor value when it is determined that the motor position sensor has not failed; and
   determine a validity of the brake fluid pressure sensor by comparing the estimated brake fluid pressure value with the received brake fluid pressure sensor value.

2. The brake fluid pressure sensor validity determination device of claim 1, wherein said processor is configured to, when it is determined that the motor position sensor has failed:
   receive, from a longitudinal acceleration sensor, a longitudinal acceleration sensor value sensed by the longitudinal acceleration sensor;
   determine whether the longitudinal acceleration sensor has failed by using the received longitudinal acceleration sensor value; and
   estimate the brake fluid pressure value on the basis of the received longitudinal acceleration sensor value when it is determined that the longitudinal acceleration sensor has not failed.

3. The brake fluid pressure sensor validity determination device of claim 1, wherein said processor is configured to determine that the brake fluid pressure sensor is not valid when a value of a difference between the estimated brake fluid pressure value and the received brake fluid pressure sensor value is maintained for a predetermined period.

4. The brake fluid pressure sensor validity determination device of claim 1, wherein said processor is configured to determine that the brake fluid pressure sensor has not failed when the brake fluid pressure sensor value is received.

5. The brake fluid pressure sensor validity determination device of claim 1, wherein said processor is configured to determine that the motor position sensor has not failed, when the motor position sensor value is received.

6. The brake fluid pressure sensor validity determination device of claim 2, wherein said processor is configured to determine that the longitudinal acceleration sensor has not failed when the longitudinal acceleration sensor value is received.

7. The brake fluid pressure sensor validity determination device of claim 1, wherein said processor is configured to:
   calculate a movement value of a power piston on the basis of the motor position sensor value;
   calculate a brake fluid volume value on the basis of the calculated movement value of the power piston;
   calculate a required brake fluid value on the basis of the calculated brake fluid volume value; and estimate the brake fluid pressure value on the basis of the calculated required brake fluid value.

8. The brake fluid pressure sensor validity determination device of claim 2, wherein said processor is configured to:
calculate a tire brake force value on the basis of a longitudinal vehicle force value calculated using the longitudinal acceleration sensor value and a vehicle weight value; a vehicle rolling resistance value, and a vehicle air resistance value; and
estimate the brake fluid pressure value on the basis of the calculated tire brake force value.

9. The brake fluid pressure sensor validity determination device of claim 1, further comprising an identifier configured to identify that the brake fluid pressure sensor is not valid when a value of a difference between the estimated brake fluid pressure value and the brake fluid pressure sensor value is maintained for a predetermined period.

10. The brake fluid pressure sensor validity determination device of claim 1, further comprising an identifier configured to identify that the brake fluid pressure sensor has not failed when a sensing signal of the brake fluid pressure sensor is received.

11. The brake fluid pressure sensor validity determination device of claim 1, further comprising an identifier configured to identify that the motor position sensor has not failed when a sensing signal of the motor position sensor is received.

12. The brake fluid pressure sensor validity determination device of claim 2, further comprising an identifier configured to identify that the longitudinal acceleration sensor has not failed when a sensing signal of the longitudinal acceleration sensor is received.

13. A brake fluid pressure sensor validity determination method performed by a brake fluid pressure sensor validity determination device comprising a processor, the method comprising:

receiving, from a brake fluid pressure sensor, a brake fluid pressure sensor value sensed by a brake fluid pressure sensor;
determining whether the brake fluid pressure sensor has failed using the received brake fluid pressure sensor value;
receiving, from a motor position sensor, a motor position sensor value sensed by a motor position sensor when it is determined that the brake fluid pressure sensor has not failed;
determining whether the motor position sensor as failed using the received motor position sensor value;
estimating a brake fluid pressure value on the basis of the motor position sensor value when it is determined that the motor position sensor has not failed; and
determining a validity of the brake fluid pressure sensor by comparing the estimated brake fluid pressure value and the brake fluid pressure sensor value.

14. The brake fluid pressure sensor validity determination method of claim 13, further comprising:
receiving, when it is determined that the motor position sensor has failed, from a longitudinal acceleration sensor, a longitudinal acceleration sensor value sensed by a longitudinal acceleration sensor;
determining whether the longitudinal acceleration sensor has failed is determined using the received longitudinal acceleration sensor value;
estimating the brake fluid pressure value on the basis of the longitudinal acceleration sensor value when it is determined that the longitudinal acceleration sensor has not failed; and
determining a validity of the brake fluid pressure sensor by comparing the estimated brake fluid pressure value and the brake fluid pressure sensor value.

* * * * *